United States Patent

Aoki

(10) Patent No.: US 9,483,683 B2
(45) Date of Patent: Nov. 1, 2016

(54) ALIGNMENT APPARATUS, ALIGNMENT METHOD, AND ALIGNMENT COMPUTER PROGRAM

(71) Applicant: FUJITSU LIMITED, Kawasaki-shi, Kanagawa (JP)

(72) Inventor: Takahiro Aoki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/637,462

(22) Filed: Mar. 4, 2015

(65) Prior Publication Data

US 2015/0269410 A1 Sep. 24, 2015

(30) Foreign Application Priority Data

Mar. 19, 2014 (JP) .................................. 2014-057147

(51) Int. Cl.
*G06K 9/00* (2006.01)
*G06K 9/62* (2006.01)
(Continued)

(52) U.S. Cl.
CPC ............. *G06K 9/00087* (2013.01); *G06K 9/00* (2013.01); *G06K 9/00885* (2013.01);
(Continued)

(58) Field of Classification Search
CPC ................ G06K 2009/00932; G06K 9/4633; G06K 9/6232; G06K 2009/4695; G06K 9/00442; G06K 9/6212; G06K 9/6211; G06K 9/00463; G06K 9/325; G06K 9/00087; G06K 9/4604; G06K 9/6215; G06K 9/00885; G06T 2207/10012; G06T 7/0044; G06T 7/0075; G06T 7/0028; G06T 2207/30176; G06T 5/006; H04N 19/90; H04N 13/0239; G03G 15/5025; G03G 2215/00316; G06F 17/30247; G06F 17/30047; G06F 17/30253; G11B 27/28

USPC ....... 382/112, 115, 159, 190, 216, 276, 281, 382/154, 164, 171, 195, 201, 209, 218

See application file for complete search history.

(56) References Cited

U.S. PATENT DOCUMENTS 8,160,366 B2 * 4/2012 Nakamura ........... G06K 9/4671
348/169
2008/0118112 A1 * 5/2008 Gotoh ................ G06K 9/00442
382/112

(Continued)

FOREIGN PATENT DOCUMENTS

| JP | 09-330414 | 12/1997 |
| JP | 2008-269629 | 11/2008 |
| JP | 2009-245347 | 10/2009 |

OTHER PUBLICATIONS

Ratha, Nalini K. et al., "A Real-Time Matching System for Large Fingerprint Databases", IEEE Transactions on Pattern Analysis and Machine Intelligence, IEEE Computer Society, USA, vol. 18, No. 8, pp. 799-812, Aug. 1, 1996.

(Continued)

*Primary Examiner* — Vu Le
*Assistant Examiner* — Aklilu Woldemariam
(74) *Attorney, Agent, or Firm* — Fujitsu Patent Center

(57) ABSTRACT

An alignment apparatus includes: a voting unit that generates multiple pairs of a first feature selected from multiple features representing a first target object represented on one image, and a second feature selected from multiple features representing a second target object represented on the other image, obtains, for each of the pairs, a first translation amount for aligning the first feature with the second feature, and votes, in a coordinate system with coordinates each representing a translation amount, a voting value for the coordinate corresponding to the first translation amount; and a translation amount calculating unit that calculates the total of the voting values for each of the coordinates in the coordinate system, and sets the translation amount corresponding to the coordinate with the largest total of the voting values, as a second translation amount for aligning the first target object with the second target object.

17 Claims, 8 Drawing Sheets

(51) Int. Cl.
  *G06T 5/00*  (2006.01)
  *G06K 9/46*  (2006.01)
  *G06T 7/00*  (2006.01)

(52) U.S. Cl.
  CPC .......... *G06K 9/4633* (2013.01); *G06K 9/6211* (2013.01); *G06K 9/6212* (2013.01); *G06T 5/006* (2013.01); *G06T 7/0028* (2013.01); *G06K 2009/00932* (2013.01)

(56) References Cited

U.S. PATENT DOCUMENTS

| | | | |
|---|---|---|---|
| 2008/0232713 A1 | 9/2008 | Iizuka | |
| 2009/0202156 A1* | 8/2009 | Konishi | G06F 17/30247 382/209 |
| 2009/0245593 A1 | 10/2009 | Suzuki et al. | |
| 2011/0235899 A1* | 9/2011 | Tanaka | G06T 7/0028 382/154 |
| 2014/0016830 A1* | 1/2014 | Wang | G06K 9/00885 382/115 |
| 2014/0193076 A1* | 7/2014 | Gardiner | G06K 9/46 382/190 |
| 2015/0379368 A1* | 12/2015 | Shiiyama | G06K 9/6215 382/201 |

OTHER PUBLICATIONS

Lowe, David G., "Distinctive Image Features from Scale-Invariant Keypoints" International Journal of Computer Vision, vol. 60, No. 2, Jan. 5, 2004, pp. 91-110.

Wang, Jian-Gang et al., "Feature-Level Fusion of Palmprint and Palm Vein for Person Identification Based on a Junction Point Presentation", 15th IEEE International Conference on Image Processing: ICIP 2008, San Diego, California, USA, Oct. 12, 2008, pp. 253-256.

Singla, Divya et al., "A Review on: Palm Vein Technology" International Journal of Engineering Research and General Science, vol. 3, No. 2, Apr. 1, 2015, pp. 397-402.

Zhou,Yingbo et al., "Human Identification Using Palm-Vein Images" IEEE Transactions on Information Forensics and Security, IEEE, Piscataway, NJ, USA, vol. 6, No. 4, Dec. 1, 2011, pp. 1259-1274.

Extended European Search Report dated Oct. 22, 2015 for corresponding European Patent Application No. 15156917.5, 8 pages.

* cited by examiner

ALIGNMENT APPARATUS, ALIGNMENT METHOD, AND ALIGNMENT COMPUTER PROGRAM

CROSS-REFERENCE TO RELATED APPLICATION

This application is based upon and claims the benefit of priority of the prior Japanese Patent Application No. 2014-057147, filed on Mar. 19, 2014, the entire contents of which are incorporated herein by reference.

FIELD

The embodiments discussed herein are related to an alignment apparatus, an alignment method, and an alignment computer program that align a target object represented on an image with a target object represented on the other image.

BACKGROUND

To recognize a target object by using images or to detect a target object represented on an image in character recognition, detection of a particular object, biometric authentication, or the like, a process for comparing target objects represented on two respective images may be carried out. For such comparison, it is preferable that the positions of the target objects in the respective images match. However, the positional relationship between each target object and an image capturing device that captures the target object and generates the image of the target object is not necessarily the same. This sometimes causes the positions of the target objects in respective images to be different. To address this issue, an alignment process is carried out for aligning the target objects in the respective images.

When relative positional relationship between the target objects in respective images is uncertain, an alignment apparatus that carries out an alignment process computes, for example, while changing the position of a comparison image with respect to a reference image little by little by using affine transformation, cross-correlation values between the two images to thereby obtain the largest cross-correlation value. By moving the comparison image to have the positional relationship corresponding to the largest cross-correlation value, the alignment apparatus aligns the target object in the comparison image with the target object in the reference image.

However, in the alignment process as described above, the alignment apparatus carries out a process for computing a cross-correlation value a great number of times, which causes a large amount of computation and consequently takes long time for alignment. To address this problem, a technique has been proposed for reducing the amount of computation for an alignment process (for example, refer to Japanese Laid-open Patent Publication No. 2009-245347).

In the pattern alignment method disclosed in Japanese Laid-open Patent Publication No. 2009-245347, each of a comparison reference pattern and comparison target pattern is converted to an angle, a scale, a middle-point X coordinate, and a middle-point Y coordinate, and the difference in angle is calculated on the basis of the angles and scales while the scale ratio is calculated on the basis of the middle-point X coordinates and the middle-point Y coordinates. Then, in this alignment method, after one of the comparison reference pattern and the comparison target pattern is transformed in terms of angle and scale, template matching is repeatedly carried out along a set search path to determine a translation amount (i.e., parallel shift amount).

SUMMARY

Although the pattern alignment method disclosed in Japanese Laid-open Patent Publication No. 2009-245347 can reduce the computation amount for obtaining the amounts of adjustment in terms of angle and scale, template matching is repeatedly carried out to determine a translation amount for aligning the patterns included in two respective images. Hence, this pattern alignment method involves a great amount of computation for determining the translation amount.

According to one embodiment, an alignment apparatus is provided. The alignment apparatus includes: a voting unit that generates a plurality of pairs of a first feature, which is selected from a plurality of features representing a first target object represented on one image, and a second feature, which is selected from a plurality of features representing a second target object represented on the other image, obtains, for each of the plurality of pairs, a first translation amount for aligning the first feature with the second feature, and votes, in a coordinate system with coordinates each representing a translation amount, a voting value for the coordinate corresponding to the first translation amount; and a translation amount calculating unit that calculates the total of the voting values for each of the coordinates in the coordinate system, and sets the translation amount corresponding to the coordinate with the largest total of the voting values, as a second translation amount for aligning the first target object with the second target object.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

In the following, an alignment apparatus will be described with reference to the drawings. The alignment apparatus generates a plurality of pairs of one feature selected from a plurality of features of a target object represented on one image and one feature selected from a plurality of features of a target object represented on the other image. Then, the alignment apparatus obtains, for each pair, a translation amount (first translation amount) for aligning the one feature with the other feature. The alignment apparatus votes for the coordinates corresponding to the obtained translation amount in a voting coordinate system with coordinates representing translation amounts. Then, the alignment apparatus sets the translation amount corresponding to the coordinates having the largest total of the vote values in the voting coordinate system, as a translation amount (second translation amount) for aligning the target object represented on the one image with the target object represented on the other image.

In the following description, a target object will be a palm vein pattern to be used in biometric authentication, and an image representing a palm vein pattern will be referred to as a vein image.

In this specification, the term "matching process" is used to refer to the process for calculating an index that indicates the degree of difference or the degree of similarity between user's biometric information and registered user's biometric information. Further, the term "biometric authentication process" is used to refer to the entire authentication process that includes not only the matching process but also the process for determining whether the user is an authenticated user or not by using the index obtained by the matching process.

Figure 1:
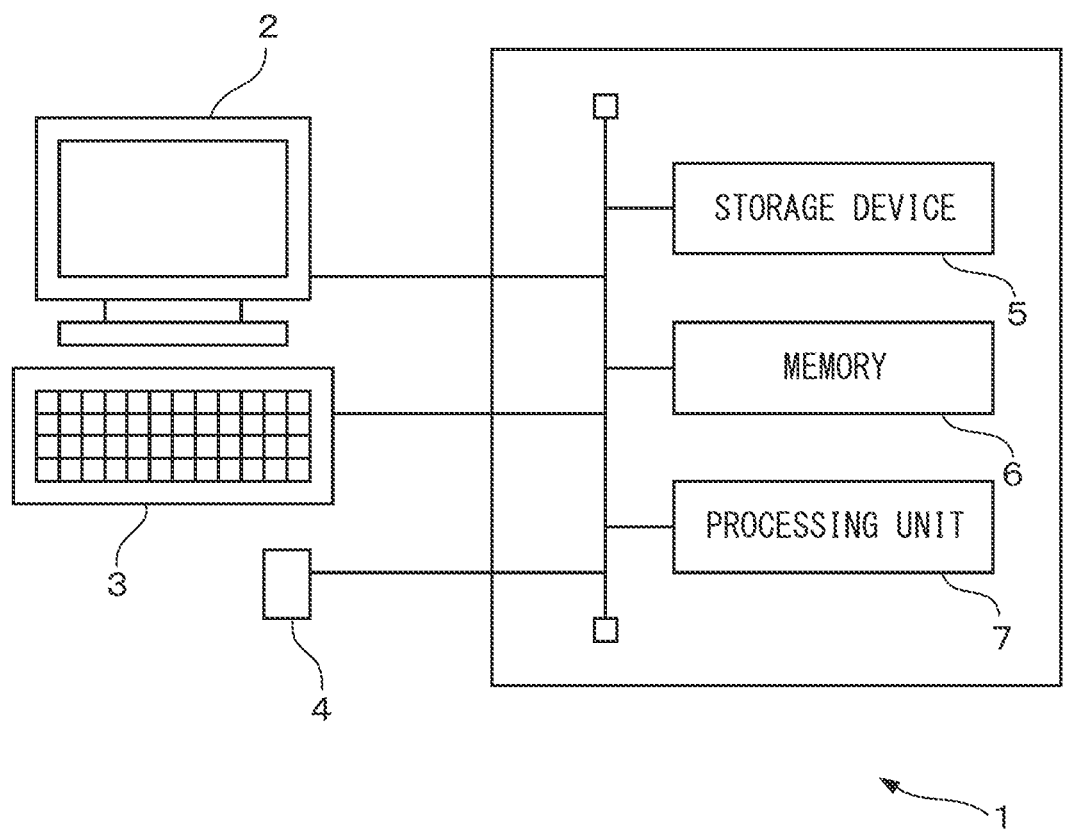
FIG. 1 is a diagram schematically illustrating the configuration of a biometric authentication apparatus that is a first embodiment of an alignment apparatus.

FIG. 1 is a diagram schematically illustrating a biometric authentication apparatus that is a first embodiment of the alignment apparatus. As illustrated in FIG. 1, a biometric authentication apparatus 1 includes a display unit 2, an input unit 3, a biometric information acquiring unit 4, a storage device 5, a memory 6, and a processing unit 7. The display unit 2, the input unit 3, and the biometric information acquiring unit 4 may be provided separately from the housing containing the storage device 5, the memory 6, and the processing unit 7. Alternatively, the display unit 2, the input unit 3, the biometric information acquiring unit 4, the storage device 5, the memory 6, and the processing unit 7 may be contained in a single housing. The biometric authentication device 1 may further include a storage media access device (not depicted) for accessing a storage medium such as a semiconductor memory card or an optical storage medium. Then, the biometric authentication apparatus 1 may read out, via the storage media access device, a biometric authentication computer program stored on the storage medium and to be executed on the processing unit 7, and may carry out the biometric authentication process in accordance with the computer program.

The biometric authentication apparatus 1 carries out the biometric authentication process on the basis of a vein image representing a user's palm vein pattern and generated by the biometric information acquiring unit 4, by matching the user's palm vein pattern with each registered user's palm vein pattern. When the user is authenticated as being one of the registered users as a result of the biometric authentication, the biometric authentication apparatus 1 permits the user to use a host apparatus in which the biometric authentication apparatus 1 is incorporated. Alternatively, the biometric authentication apparatus 1 transmits, to another apparatus (not depicted), a signal indicating that the user is authenticated, and permits the user to use that other apparatus.

The display unit 2 includes a display device such as a liquid crystal display. The display unit 2 displays, to the user, a guidance message indicating the position to place his hand, for example. The display unit 2 also displays a message indicating the result of the biometric authentication process carried out by the processing unit 7, or various kinds of information associated with applications being executed.

The input unit 3 includes a user interface such as a keyboard, a mouse, or a touchpad, for example. User information, such as the user name or the user number, a command, or data entered via the input unit 3 by the user is passed to the processing unit 7. However, when the user does not need to enter any information other than biometric information to the biometric authentication apparatus 1, the input unit 3 may be omitted.

The biometric information acquiring unit 4 captures the vein pattern of one of the hands of the user from the palm side of the hand, and generates a vein image representing the vein pattern, for example. For this purpose, the biometric information acquiring unit 4 includes, for example, an illuminating light source for emitting near-infrared radiation for lighting the user's hand, and an area sensor including two-dimensional array of solid-state image sensing devices sensitive to the near-infrared radiation. The biometric information acquiring unit 4 further includes a base on which a hand is to be placed while the palm is facing upward. The area sensor and the illuminating light source are disposed above the base while being directed downward so as to face the base with the hand placed therebetween. Further, a mark indicating the position to place a hand may be depicted on the base. The mark is, for example, a mark indicating the outline of the hand or a mark indicating the positions of the fingertips and the wrist when the hand is placed at an ideal position.

As described above, since the position of the hand for image capturing is specified in this embodiment, the distance between the area sensor and the hand, and the direction of the hand with respect to the area sensor are kept substantially constant. For this reason, in this embodiment, when the user's palm vein pattern on the vein image is to be aligned with each registered user's palm vein pattern, correction is not made to the two vein patterns in terms of rotation and scale.

The storage device 5 is an example of a storage unit, and includes, for example, a magnetic recording disk and an access device for accessing the magnetic recording disk. The storage device 5 stores an application program to be used in the biometric authentication device 1, the user name, user identification number, and personal setting information of at least one registered user, various kinds of data, and the like. The storage device 5 also stores a program for carrying out the biometric authentication process. Further, for each registered user, the storage device 5 stores matching feature information representing the features of the palm vein pattern of one of the hands, the palm vein pattern being the biometric information of the registered user, together with the user identification information of the registered user such as the user name and user identification number of the registered user.

In this embodiment, the matching feature information includes information indicating the position, length, and inclination of each line segment when each vein included in the vein pattern represented on each vein image is represented by a plurality of line segments approximately. Further, each line segment is an example of the features representing the target object on the image. The position of each line segment is represented by the coordinates of the middle point of the line segment on the vein image. The length of each line segment is represented by the coordinates of the two end points of the line segment or the distance between the two ends of the line segment, for example. The inclination of each line segment is represented by the angle between a horizontal line on the vein image and the line segment, for example. The matching feature information of each registered user is obtained by a registration process that will be described later, and is then stored in the storage device 5.

The memory 6 is another example of the storage unit, and includes, for example, a nonvolatile semiconductor memory and a volatile semiconductor memory. The memory 6 temporarily stores various data to be used in the program being executed on the processing unit 7.

The processing unit 7 includes one or a plurality of processors and their peripheral circuitry. The processing unit 7 acquires a vein image including the vein pattern of one of the hands of one of the user and the registered users, from the biometric information acquiring unit 4. Then, the processing unit 7 extracts matching feature information from the vein image. Then, the processing unit 7 carries out the biometric authentication or the registration process using the matching feature information. When carrying out the biometric authentication process, the processing unit 7 carries out the alignment process using the user's matching feature information and the registered user's matching feature information, to thereby align the user's vein pattern and the registered user's vein pattern. Then, the processing unit 7 matches the user's vein pattern and the registered user's vein pattern by using the result of the alignment.

Figure 2:
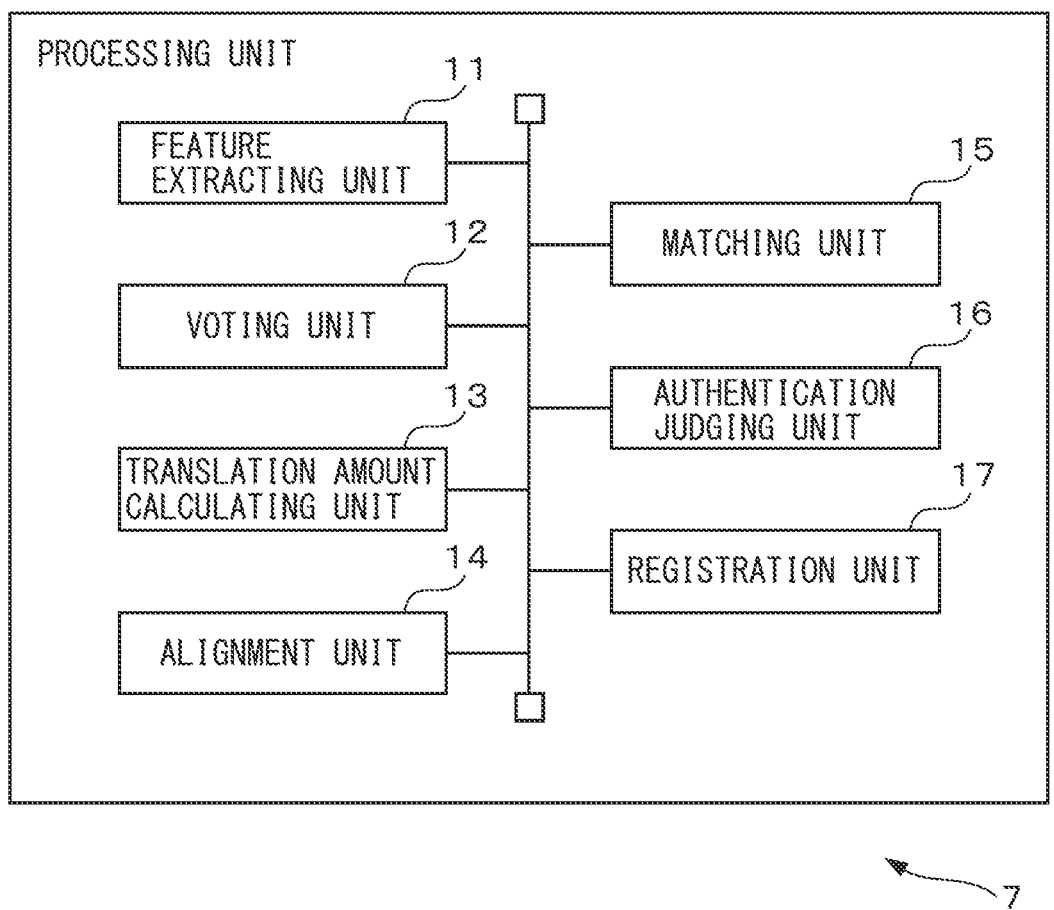
FIG. 2 is a functional block diagram of a processing unit of the biometric authentication apparatus.

FIG. 2 is a functional block diagram of the processing unit 7. As illustrated in FIG. 2, the processing unit 7 includes a feature extracting unit 11, a voting unit 12, a translation amount calculating unit 13, an alignment unit 14, a matching unit 15, an authentication judging unit 16, and a registration unit 17. These units constituting the processing unit 7 are functional modules implemented by executing a computer program executed on a processor contained in the processing unit 7. Alternatively, these units constituting the processing unit 7 may be implemented as firmware on the biometric authentication apparatus 1.

The feature extracting unit 11 is used in both the biometric authentication process and the registration process. The voting unit 12, the translation amount calculating unit 13, the alignment unit 14, the matching unit 15, and the authentication judging unit 16 are used in the biometric authentication process. Of these units, the voting unit 12, the translation amount calculating unit 13, and the alignment unit 14 relate to the alignment process. Meanwhile, the registration unit 17 is used in the registration process. In the following, the units related to the biometric authentication process will be described first.

The feature extracting unit 11 extracts, from a vein image, a plurality of line segments approximately representing the veins represented on the vein image, as matching feature information.

The feature extracting unit 11 differentiates a subject region including a palm and a background area not including the palm, on the vein image. For example, when the illuminating light source and the area sensor of the biometric information acquiring unit 4 are disposed to face the same side of the hand, the brightness values of the pixels representing the user's hand are higher than the brightness values of the other pixels. In view of this, the feature extracting unit 11 extracts, for example, a group of pixels in which a brightness value of each pixel is not smaller than a subject judging threshold value, as a subject region. The subject judging threshold value is set, for example, at a preset fixed value (e.g., 10), or the average value of the brightness values of the respective pixels in the vein image.

Then, the feature extracting unit 11 binarizes the subject region or the inscribed rectangular area of the subject region on the basis of the vein judging threshold value, to thereby create a binarized vein image in which groups of pixels having a possibility of representing a vein and a group of the other pixels are differentiated. For example, the brightness value of each pixel representing a vein is lower than the brightness value of each pixel around the pixel representing a vein. In view of this, the feature extracting unit 11 judges each pixel having a brightness value not larger than the vein judging threshold value as a pixel having a possibility of representing a vein, while judging each pixel having a brightness value larger than the vein judging threshold value as a pixel not representing any vain. The vein judging threshold value is set, for example, at the average value of the brightness values of the pixels in the subject region. Alternatively, the vein judging threshold value may be determined by applying Otsu's method for binarization to the distribution of the brightness values of the pixels in the subject region. In the following, each pixel having a possibility of representing a vein will be referred to as a vein candidate pixel, for convenience.

The feature extracting unit 11 applies thinning process to each group of vein candidate pixels in the binarized vein image, thus thinning a line joining the vein candidate pixels to form a line having a width of one pixel, for example. Each line obtained by the thinning represents a single vein. Since a vein is not a straight line in general, the feature extracting unit 11 divides each line obtained by the thinning into a plurality of line segments, and thereby approximately represents the vein by the plurality of line segments.

The feature extracting unit 11 carries out, for example, the following process on each line obtained by the thinning, to divide the line into a plurality of line segments. In the following, a line which is obtained by the thinning and the process is applied to will be referred to as a target line for convenience. The feature extracting unit 11 calculates a straight line joining the two ends of the target line, and obtains the distance between each pixel on the target line and the straight line. When the largest value among the obtained distances is not smaller than a predetermined threshold value (e.g., 5), the feature extracting unit 11 divides the target line at the pixel corresponding to the largest distance value. The feature extracting unit 11 carries out the above-described process by using, as a next target line, each line obtained by dividing the target line. The feature extracting unit 11 repeatedly carries out the above-described process until the largest distance value becomes smaller than the predetermined threshold value. When the largest distance value is smaller than the predetermined threshold value, the feature extracting unit 11 determines the target line as a single line segment.

The feature extracting unit 11 calculates, for each obtained line segment, the coordinates of the middle point of the line segment, as the position of the line segment. The feature extracting unit 11 also calculates, for each line segment, the length and the inclination of the line segment as the attributes of the line segment. Then, when the biometric authentication process is performed, the feature extracting unit 11 outputs the matching feature information including the coordinates of the middle point, the length, and the inclination of each line segment, to the voting unit 12 and the alignment unit 14. When the registration process is to be performed, the feature extracting unit 11 outputs the matching feature information to the registration unit 17.

The voting unit 12 generates a plurality of pairs of a first feature selected from the plurality of features representing a first target object represented on one image and a second feature selected from the plurality of features representing a second target object represented on the other image. The combination of the included features is different from pair to pair. Then, the voting unit 12 obtains, for each of the plurality of pairs, the translation amount for aligning the first feature to the second feature, and votes a voting value to the coordinates corresponding to the obtained translation amount in the coordinate system having the coordinates representing translation amounts.

In this embodiment, the voting unit 12 uses a plurality of line segments obtained as user's matching feature information and representing a user's palm vein pattern and a plurality of line segments obtained as registered user's matching feature information and representing a registered user's palm vein pattern. The voting unit 12 generates a plurality of pairs of a line segment (first feature) selected from the plurality of line segments included in the user's matching feature information and a line segment (second feature) selected from the plurality of line segments included in the registered user's matching feature information. Then, the voting unit 12 obtains, for each pair, the horizontal and vertical translation amounts for aligning the line segment representing the user's palm vein pattern on the vein image with the line segment representing the registered user's palm vein pattern on the vein image. In this embodiment, the voting unit 12 aligns the middle points of the two respective line segments of the target pair. Assuming that the coordinates of the middle point of the line segment as a reference are denoted by (xa,ya) and the coordinates of the middle point of the line segment to be translated are denoted by (xb,yb). In this case, the voting unit 12 obtains (xa−xb) as the horizontal translation amount and (ya−yb) as the vertical translation amount. Then, the voting unit 12 votes a predetermined voting value (e.g., "1") for the coordinates corresponding to the obtained horizontal and vertical translation amounts in the voting coordinate system.

According to a modified example, the voting unit 12 may determine the voting value to be larger as the difference in attribute between the two features of the target pair to align is smaller. Determining a voting value in this way allows the voting value to be smaller as the possibility that the two features of the target pair correspond to different parts of the target objects is higher, which makes it possible to obtain a translation amount more accurately. For example, the voting unit 12 weights the voting value with the absolute value of the difference in inclination between the two target line segments so that the voting value would be smaller as the absolute value of the difference in inclination is larger. For example, the voting unit 12 may determine the voting value according to the following equation.

$$\text{Weight} = e^{-\alpha \Delta \theta} \quad (1)$$

In Equation (1), Weight denotes a voting value, and $\Delta\theta$ denotes the absolute value of the difference in inclination between the two target line segments. $\alpha$ is a constant. In this embodiment, when a hand is to be positioned with respect to the biometric information acquiring unit 4, the guidance is provided to place the hand in a specific direction, and hence the angle of rotation of the user's palm vein pattern with respect to the registered user's vein pattern is assumed to be within a tolerance range. Accordingly, the constant $\alpha$ is set at 1, for example, so that the voting value would be 0.01 when the rotational angle is at the maximum value (e.g.,) $\Delta\theta=5°$ of the tolerance, for example.

When the absolute value of the difference in inclination between the two target line segments is not smaller than the predetermined value (e.g., the maximum tolerance value), the voting unit 12 may not need to vote since the voting value is too small to affect the determination on the translation amount much. This can reduce the amount of computation for the determination on the translation amount without affecting the accuracy in calculation of the translation amount.

According to another modified example, the voting unit 12 may be configured to vote, when the translation amount (x0,y0) is obtained for the target feature pair, not only for the coordinates (x0,y0) but also for the coordinates around the coordinates (x0,y0). In general, the position of each extracted feature may have some error. When the position of each extracted feature has an error, the translation amounts obtained for the respective plurality of pairs of the features corresponding to the same parts of the target objects are not necessarily the same value. Even in such a case, since the voting unit 12 votes not only for the coordinates corresponding to the calculated translation amounts, but also for the coordinates around the corresponding coordinates, the possibility of voting for the coordinates corresponding to the correct translation amount increases, hence reducing the influence due to the error in each position at the time of feature extraction.

For example, the voting unit 12 sets a voting value in accordance with a Gaussian function as in the following equation.

$$\text{Weight} = \frac{1}{\sqrt{2\pi\sigma^2}} e^{-\left(\frac{(x-x_0)^2+(y-y_0)^2}{2\sigma^2}\right)} \quad (2)$$

In Equation (2), Weight denotes a voting value. (x0,y0) denotes a horizontal translation amount and a vertical translation amount, and (x,y) denotes the coordinates to be voted for in the voting coordinate system. In addition, $\sigma$ is a constant and $\sigma$ is set at a value not larger than an average distance L between two adjacent features (two adjacent veins in this embodiment), for example, (L/8). When it is assumed that the error in the position of each extracted feature is large, or that the degree of distortion of the target is different from capturing to capturing, $\sigma$ may be set at a larger value, for example, (L/2).

Alternatively, the voting unit 12 may determine the voting value in accordance with the following equation instead of Equation (2) so that the voting value for the coordinates would be smaller as the absolute value of the difference in inclination between the two target line segments is larger.

$$\text{Weight} = \frac{1}{\sqrt{2\pi\sigma^2}} e^{-\left(\frac{(x-x_0)^2+(y-y_0)^2}{2\sigma^2}\right)} e^{-\alpha\Delta\theta} \quad (3)$$

The voting unit 12 does not have to vote for the coordinates for which the voting value is smaller than a predetermined value. The predetermined value is set at 0.01 to 0.1, for example.

Further, $\sigma$ may be adjusted according to the positions of the two target features. For example, when the target objects for alignment are palm vein patterns as in this embodiment, the influence of change in shape at the time of capturing each hand is larger at a position closer to the edge of the palm. In addition, for the purpose of representing the entire vein pattern on a vein image, the center of the palm is highly likely to be positioned near the center of the vein image. In view of these, the voting unit 12 may calculate an average value R of the distances from the center of the vein image to the two target features, and may set σ to be larger as the average value R is larger. For example, when the average distance value R is not larger than one eighth of a horizontal size SH of the vein image, the voting unit 12 sets σ=L/8. On the other hand, when the average distance value R is larger than one eighth of the horizontal size SH of the vein image, the translation amount calculating unit 13 may linearly increase σ as the average distance value R increases so that σ=L/2 when the average distance value R is half of the size SH.

When the distance between the two target features is a certain length or larger, the two features are highly likely to represent different parts of the target objects. In this case, the translation amount obtained on the basis of the two features causes the alignment of the target objects to be inaccurate. For this reason, when the distance between the two target features is not smaller than a predetermined threshold value, the voting unit 12 may not need to vote for the coordinates corresponding to the translation amount obtained on the basis of the two features. The predetermined threshold value may be set to be half of the horizontal or vertical width of the vein image, for example. Alternatively, the voting unit 12 may not need to calculate a translation amount and vote, for each pair of a user's feature positioned in a predetermined range (e.g., one fifth to one third of the horizontal width of the image) from one image edge of the vein image and a registered user's feature positioned within the predetermined range from the other image edge of the vein image. This reduces the number of votes, consequently reducing the amount of computation. Moreover, when the distance between the two target features is large, the two features highly likely correspond to different parts. Hence, preventing the voting unit 12 from voting for the translation amount obtained on the basis of the two features, increases the possibility of improving the accuracy in the translation amounts for aligning the user's palm vein pattern and the registered user's palm vein pattern.

The translation amount calculating unit 13 calculates a translation amount for aligning the user's palm vein pattern on the vein image and the registered user's palm vein pattern on the vein image, on the basis of the voting values of the coordinates in the voting coordinate system. In this embodiment, the translation amount calculating unit 13 determines the horizontal and vertical translation amounts corresponding to the coordinates having the largest total voting value in the voting coordinate system, to be the translation amount for aligning the user's palm vein pattern on the vein image and the registered user's palm vein pattern on the vein image.

The translation amount calculating unit 13 may determine the total of the voting values of the target coordinates and the voting values of the coordinates around the target coordinates in a predetermined range, to be the total of the voting values of the target coordinates, instead of the voting unit 12 voting for a plurality of coordinates. Alternatively, the translation amount calculating unit 13 may determine the translation amount corresponding to the coordinates having the largest weighted average value by obtaining the weighted average of the total of the voting values of the target coordinates and the total of the voting values of the coordinates around the target coordinates, to be the translation amount for the alignment of the target objects. In this case, the translation amount calculating unit 13 may use the coordinates (x0,y0) in the Equation (2) as target coordinates and the voting value obtained according to the Equation (2) as a weighting factor by which the total of the voting values of the coordinates (x,y) would be multiplied. By determining the translation amount as described above, the translation amount calculating unit 13 can reduce the influence due to the error at the time of feature extraction. Further, when the number of features is small, counting the total of the voting values of the plurality of coordinates at the time of determining a translation amount involves less amount of computation than that involved in the case of voting for a plurality of coordinates at the time of voting.

Figure 3:
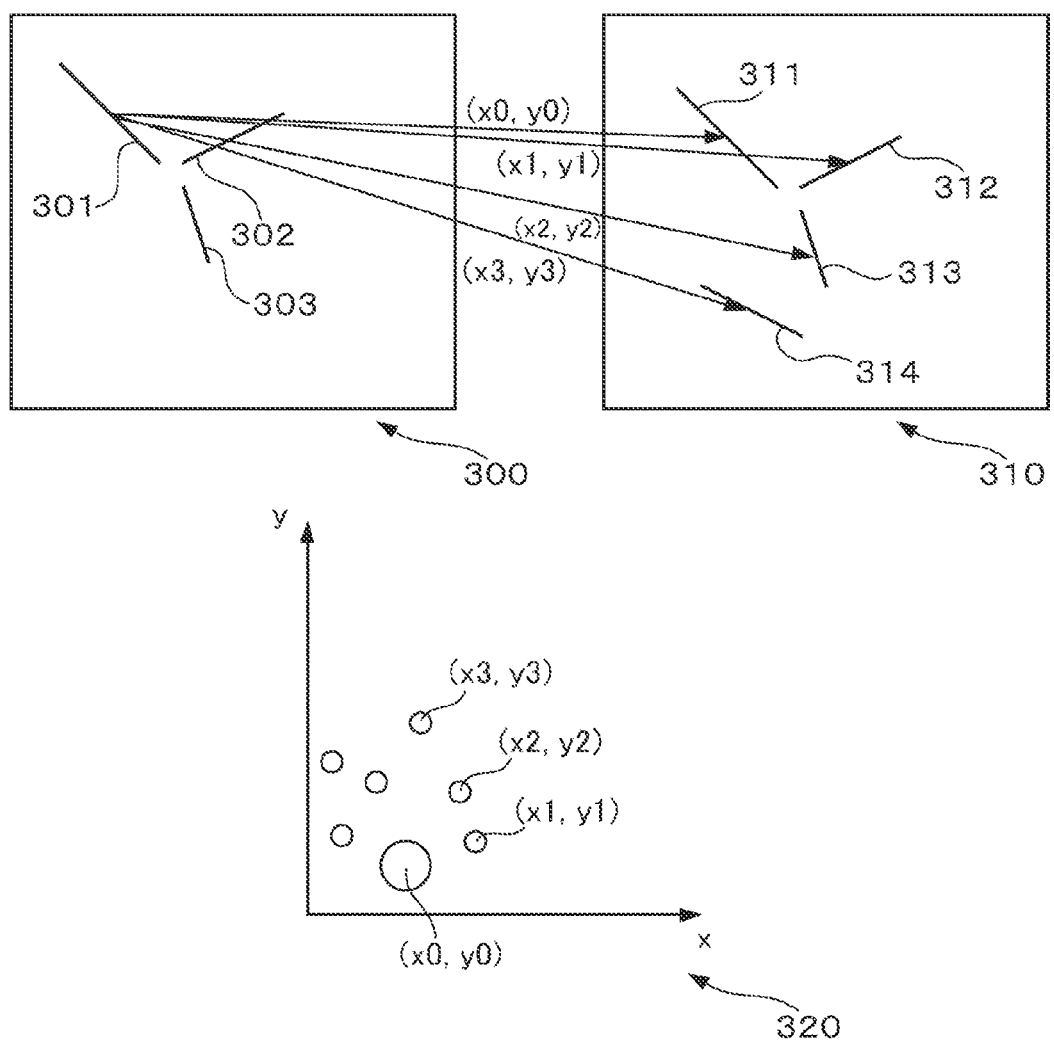
FIG. 3 is a figure schematically illustrating voting for translation amounts.

With reference to FIG. 3, description will be given of determination of a translation amount. In the following, it is assumed that two vein images 300 and 310 each including a palm vein pattern are to be aligned. Three line segments 301 to 303 are extracted as features of a target object from the vein image 300, while four line segments 311 to 314 are extracted as features of a target object from the vein image 310. The voting unit 12 calculates, for each line segment on the vein image 300, a translation amount for aligning the line segment with each line segment on the vein image 310. For example, assume that, when the line segment 301 is to be aligned with the line segment 311, a horizontal translation amount is x0 and a vertical translation amount is y0. In this case, the voting unit 12 votes a voting value "1" for the coordinates (x0,y0) in a voting coordinate system 320 with the horizontal axis representing a horizontal translation amount and the vertical axis representing a vertical translation amount. In addition, assume that the horizontal and vertical translation amounts for aligning the line segment 301 with the line segments 312 to 314 are (x1,y1), (x2,y2), and (x3,y3), respectively. In this case, the voting unit 12 also votes a voting value "1" for the coordinates (x1,y1), (x2,y2), and (x3,y3) in the voting coordinate system 320.

Similarly, the voting unit 12 also calculates, for each of the line segments 302 and 303, horizontal and vertical translation amounts when the line segment is to be aligned to each of the line segments 311 to 314. Then, the voting unit 12 votes a voting value "1" for the coordinates corresponding to the combination of the horizontal and vertical translation amounts in the voting coordinate system 320.

In FIG. 3, the size of each circle in the voting coordinate system 320 represents the total of the voting values of the coordinates corresponding to the circle, and the total of the voting values is larger as the size of the circle is larger. As depicted in the voting coordinate system 320, since the total of the voting values of the coordinates (x0,y0) is the largest, the translation amount calculating unit 13 determines the horizontal translation amount to be x0 and the vertical translation amount to be y0 for aligning the palm vein pattern on the vein image 300 with the palm vein pattern on the image 310.

The alignment unit 14 corrects the position of each of the line segments included in the matching feature information by moving the line segment by the horizontal and vertical translation amounts calculated by the translation amount calculating unit 13. In this way, the user's palm vein pattern on the vein image is aligned with the registered user's palm vein pattern on the vein image.

According to a modified example, the alignment unit 14 may move each of the line segments included in the registered user's matching feature information according to the translation amount calculated by the translation amount calculating unit 13. In this case, the alignment unit 14 may obtain a translation amount that is applied to each line segment included in the registered user's matching feature information by changing the sign (plus/minus) of each of the horizontal and vertical translation amounts calculated by the translation amount calculating unit 13.

Figure 4:
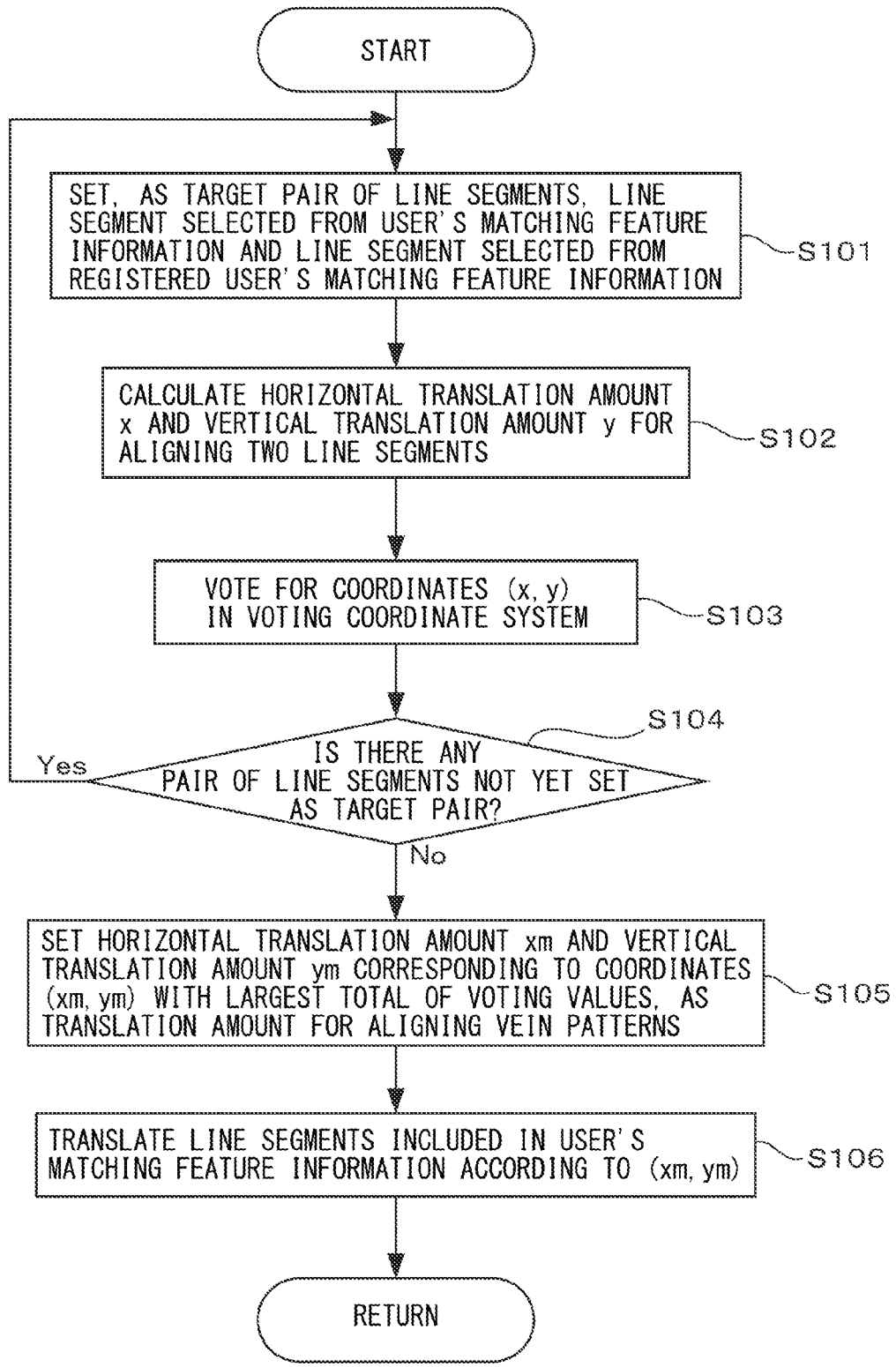
FIG. 4 is an operation flowchart illustrating an alignment process.

FIG. 4 is an operation flowchart illustrating the alignment process carried out by the voting unit 12, the translation amount calculating unit 13, and the alignment unit 14.

The voting unit 12 selects a line segment from each of the matching feature information of the user and the registered user's matching feature information, and sets the pair of the selected line segments as a target pair of line segments (step S101). Then, the voting unit 12 calculates a horizontal translation amount x and a vertical translation amount y for aligning the target pair of line segments (step S102). Then, the voting unit 12 votes a predetermined voting value for the coordinates (x,y) corresponding to the pair (x,y) of the calculated horizontal translation amount and vertical translation amount in the voting coordinate system (step S103).

Thereafter, the voting unit 12 checks whether or not there is a combination of a line segment included in the user's matching feature information and a line segment included in the registered user's matching feature information and that has not been set as a target pair of line segments (step S104). When there is a pair having not been set as a target pair of line segments (Yes in step S104), the voting unit 12 repeats the operations in step S101 and thereafter.

On the other hand, when there is no pair of line segments having not been set as a target pair of line segments (No in step S104), the translation amount calculating unit 13 identifies the coordinates (xm,ym) having the largest total of the voting values in the voting coordinate system. Then, the translation amount calculating unit 13 determines the pair of the horizontal translation amount xm and the vertical translation amount ym to be the translation amount for aligning the user's vein pattern on the vein image with the registered user's vein pattern (step S105).

The alignment unit 14 translates each of the line segments included in the user's matching feature information according to the translation amount (xm,ym) (step S106). Through these operations, the user's palm vein pattern represented on the vein image and the registered user's palm vein pattern are aligned.

The matching unit 15 matches the user's vein pattern with the registered user's vein pattern by using user's matching feature information received from the alignment unit 14 after the alignment and the registered user's matching feature information. Then, the matching unit 15 obtains a matching score indicating the degree of similarity between the user's vein pattern and the registered user's vein pattern as a result of the matching process.

The matching unit 15 calculates, for example, for each of the line segments included in the user's matching feature information, the distance between the line segment and the closest one of the line segments included in the registered user's matching feature information. The matching unit 15 may set the distance between the middle points of the respective two target line segments as the distance between the two line segments. Alternatively, the matching unit 15 may calculate the total number of pixels that do not match among the pixels included in the two target line segments, i.e., the Hamming distance. In this case, the matching unit 15 may set the value obtained by dividing the Hamming distance by the length of one of the two target line segments, or the Hamming distance itself, as the distance between the two line segments.

The matching unit 15 calculates the inverse of the average value of the distances calculated for the line segments included in the user's matching feature information, as a matching score. In this calculation, when the average distance value is smaller than a predetermined value (e.g., 0.1 to 1), the matching unit 15 may set the matching score at the largest possible value (e.g., 1).

Alternatively, the matching unit 15 may use, as a matching score, the number obtained by dividing the number of line segments each having the distance to the closest one of the line segments included in the registered user's matching feature information, the distance being not larger than a predetermined value, by the total number of line segments included in the user's matching feature information.

The matching unit 15 passes the matching score and the registered user's identification information to the authentication judging unit 16.

When the matching score is not lower than an authentication judging threshold value, the authentication judging unit 16 judges that the user's vein pattern and the registered user's vein pattern match. Then, the authentication judging unit 16 authenticates the user as being the registered user. When the user is authenticated, the authentication judging unit 16 notifies the processing unit 7 of the result.

On the other hand, when the matching score is lower than the authentication judging threshold value, the authentication judging unit 16 judges that the user's vein pattern and the registered user's vein pattern do not match. In this case, the authentication judging unit 16 does not authenticate the user as being the registered user. The authentication judging unit 16 notifies the processing unit 7 of the authentication result indicating that the authentication of the user was unsuccessful. The authentication unit 7 may cause the display unit 2 to display a message indicating the authentication result.

The authentication judging threshold value is preferably set at such a value that the authentication judging unit 16 would successfully authenticate the user only when any one of the registered users is the user. In other words, the authentication judging threshold value is preferably set at such a value that the authentication judging unit 16 would fail to authenticate the user when the user is a person different from the registered users. For example, the authentication judging threshold value may be set at a value obtained by adding the value obtained by multiplying the difference between the largest possible value and the smallest possible value of the matching score by 0.7, to the smallest value of the degree of similarity.

Figure 5:
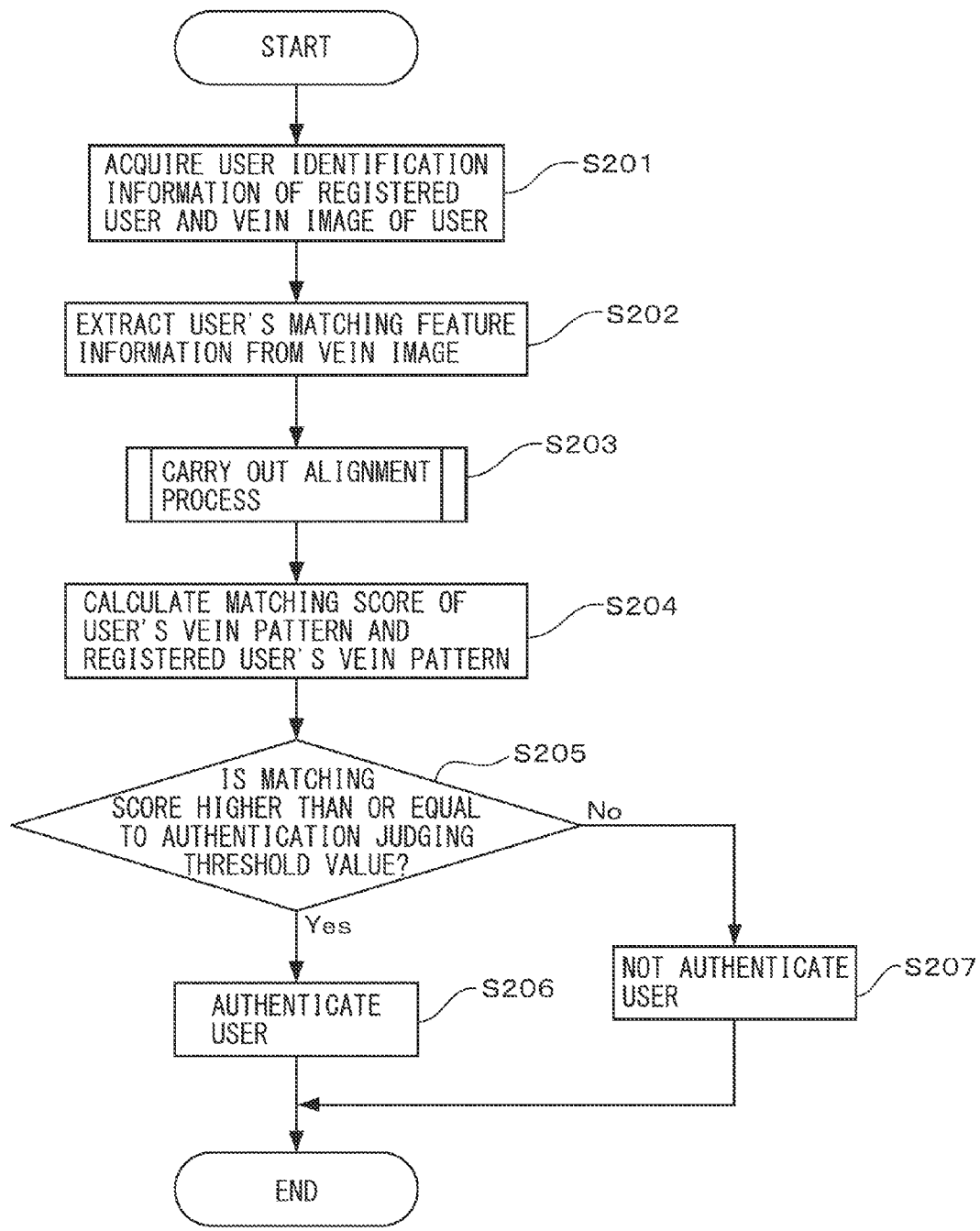
FIG. 5 is an operation flowchart illustrating a biometric authentication process.

FIG. 5 is an operation flowchart illustrating the biometric authentication process carried out by the processing unit 7. The processing unit 7 acquires user identification information for identifying the registered user to be the authentication target. In addition, the processing unit 7 receives, from the biometric information acquiring unit 4, a vein image including the vein pattern of one of the palms of the user attempting to be authenticated (step S201). Then, the feature extracting unit 11 extracts, from the vein image, matching feature information including a plurality of line segments approximately representing the vein pattern (step S202).

Moreover, the processing unit 7 reads the matching feature information of the registered user identified on the basis of the user identification information, from the storage device 5. The voting unit 12, the translation amount calculating unit 13, and the alignment unit 14 carry out the alignment process on the user's matching feature information and the registered user's matching feature information (step S203).

The matching unit 15 matches the user's matching feature information after the alignment and the registered user's matching feature information, and thereby calculates the matching score of the user's vein pattern and the registered user's vein pattern (step S204).

The authentication judging unit 16 checks whether or not the matching score is higher than or equal to the authentication judging threshold value (step S205). When the matching score is higher than or equal to the authentication judging threshold value (Yes in step S205), the authentication judging unit 16 judges that the user's biometric information and the registered user's biometric information match. Then, the authentication judging unit 16 authenticates the user as being the registered user (step S206). When the user is authenticated, the authentication judging unit 16 notifies the processing unit 7 of the authentication result. Then, the processing unit 7 permits the authenticated user to use a host apparatus in which the biometric authentication apparatus 1 is incorporated or an apparatus to which the biometric authentication apparatus 1 is connected.

On the other hand, when the matching score is lower than the authentication judging threshold value (No in step S205), the authentication judging unit 16 judges that the user's biometric information and the registered user's biometric information do not match. Accordingly, the authentication judging unit 16 does not authenticate the user (step S207). Then, the authentication judging unit 16 notifies the processing unit 7 that the user is not authenticated. In this case, the processing unit 7 refuses the user who is not authenticated, from using the apparatus in which the biometric authentication apparatus 1 is incorporated or the apparatus to which the biometric authentication apparatus 1 is connected. The processing unit 7 may also cause the display unit 2 to display a message indicating that the authentication failed. After step S206 or S207, the processing unit 7 terminates the biometric authentication process.

When the so-called 1:N (one-to-many) authentication method is employed, i.e., when user identification information of each registered user is not input, the voting unit 12 and the translation amount calculating unit 13 calculate, for each registered user, a translation amount for alignment. Then, the alignment unit 14 translates, for each registered user, each of the line segments included in the matching feature information in accordance with the calculated translation amount. Then, the matching unit 15 obtains a matching score for each registered user. The matching unit 15 selects the registered user having the highest matching score. The matching unit 15 passes the largest value of the matching score and the user identification information of the registered user corresponding to the largest value, to the authentication judging unit 16. When the largest value of the matching score is not lower than the authentication judging threshold value, the authentication judging unit 16 authenticates the user as being the registered user corresponding to the largest value of the matching score.

Next, the registration unit 17 related to the registration process will be described. In the registration process, the processing unit 7 also receives a vein image including one of the hands of each user to be registered, from the biometric information acquiring unit 4. Then, the feature extracting unit 11 of the processing unit 7 extracts matching feature information from the vein image, and then outputs the matching feature information to the registration unit 17.

The registration unit 17 acquires the user name of the user to be registered, from the input unit 3. Then, the registration unit 17 sets a user identification number, which is uniquely set for the user. Then, the registration unit 17 stores the user name and the user identification number of the user together with the matching feature information received from the feature extracting unit 11, in the storage device 5. Through these operations, the user is registered as a registered user who is permitted to use the host apparatus in which the biometric authentication apparatus 1 is incorporated.

As has been described above, the biometric authentication apparatus, which is an example of an alignment apparatus, votes for coordinates corresponding to the translation amount for aligning the plurality of features of the target object represented on one image with the respective plurality of features of the target object represented on the other image, in the voting coordinate system. The biometric authentication apparatus sets the translation amount corresponding to the coordinates having the largest total of the voting values, as the translation amount for aligning the target objects. In general, the number of features is smaller than the number of pixels in an image. Accordingly, the biometric authentication apparatus can reduce the amount of computation for calculating a translation amount than that for obtaining a translation amount by finding the best-matching position through trial and error while changing the positions of the two images little by little. Moreover, the biometric authentication apparatus sets the pair of the horizontal translation amount and the vertical translation amount corresponding to the coordinates having the largest total of the voting values, as a translation amount for alignment. Hence, the biometric authentication apparatus can determine translation amounts accurately so that many features would be aligned although not all of the features are extracted.

Next, a biometric authentication apparatus according to a second embodiment of the alignment apparatus will be described. The biometric authentication apparatus uses lines that are not limited to straight lines and curved lines, as features to represent a target object. The biometric authentication apparatus sets at least one line mark, which is to serve as a reference point for alignment, at predetermined intervals on each line, and determines coordinates to be voted on the voting coordinate system, for each line mark.

In the second embodiment, as in the first embodiment, target objects to align are each a palm vein pattern represented on a vein image. However, in this embodiment, features representing each target object are each assumed to be a straight line or a curved line representing an individual vein included in the vein pattern. Moreover, in this embodiment, to align a user's palm vein pattern on a vein image with a registered user's palm vein pattern, the biometric authentication apparatus also corrects the difference in rotation and size between the vein patterns.

Figure 6:
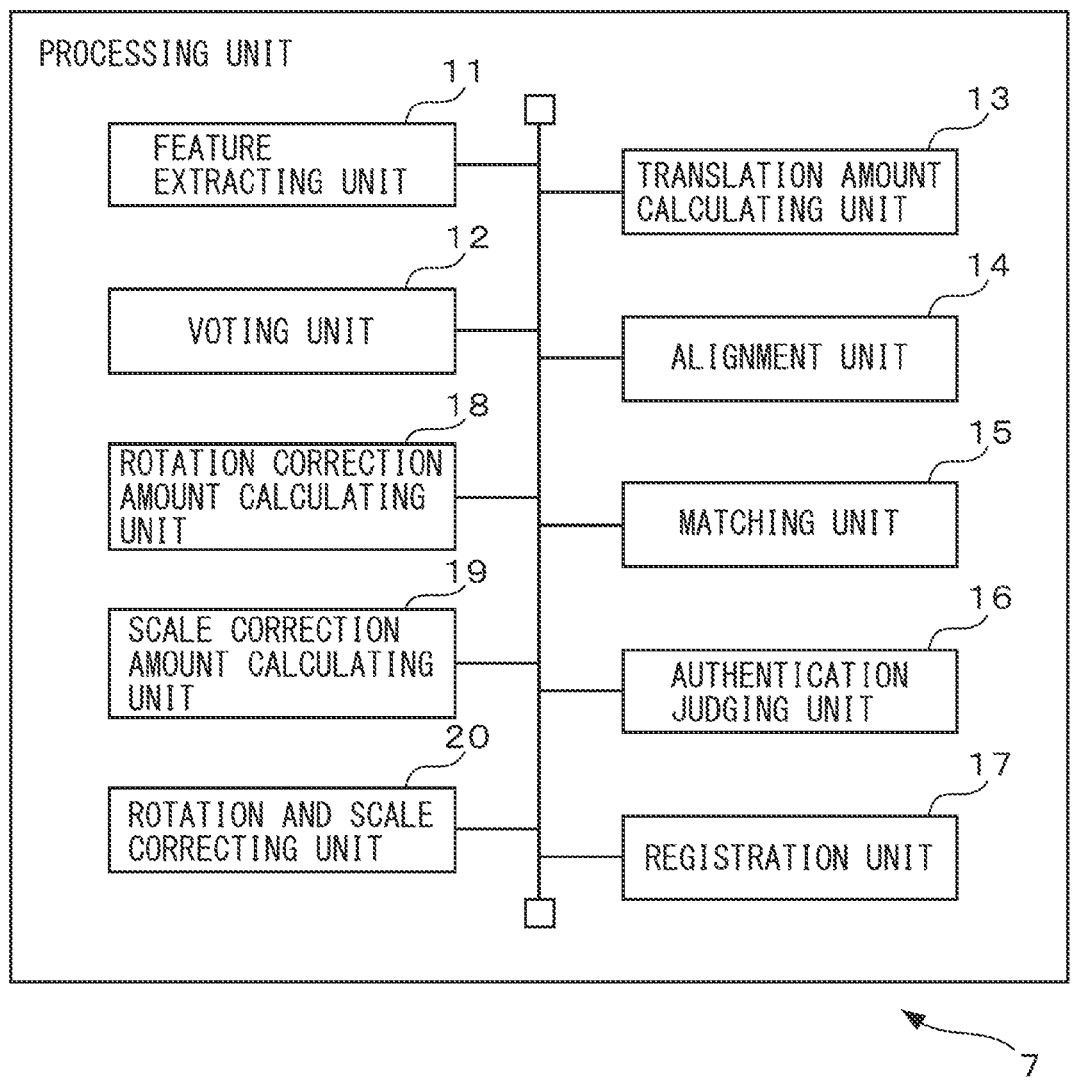
FIG. 6 is a functional block diagram of a processing unit of a biometric authentication apparatus according to a second embodiment.

FIG. 6 is a functional block diagram illustrating a processing unit of the biometric authentication apparatus according to the second embodiment. The processing unit 7 of the biometric authentication apparatus according to the second embodiment includes a feature extracting unit 11, a rotation correction amount calculating unit 18, a scale correction amount calculating unit 19, a rotation and scale correcting unit 20, a voting unit 12, a translation amount calculating unit 13, an alignment unit 14, a matching unit 15, an authentication judging unit 16, and a registration unit 17. The biometric authentication apparatus according to the second embodiment is different from the biometric authentication apparatus according to the first embodiment in terms of including the rotation correction amount calculating unit 18, the scale correction amount calculating unit 19, and the rotation and scale correcting unit 20, as well as the process carried out by the feature extracting unit 11 and the process carried out by the voting unit 12. For this reason, description will be given below of the feature extracting unit 11, the rotation correction amount calculating unit 18, the scale correction amount calculating unit 19, the rotation and scale correcting unit 20, and the voting unit 12. As to the details of the other components of the biometric authentication apparatus according to the second embodiment, refer to the description of the corresponding components of the biometric authentication apparatus according to the first embodiment.

As in the first embodiment, the feature extracting unit 11 obtains a binarized vein image, and applies thinning to each group of vein candidate pixels in the binarized vein image, thus thinning a line joining the vein candidate pixels to form a line having a width of one pixel. Then, the feature extracting unit 11 sets each line obtained by the thinning as a feature representing a single vein.

The feature extracting unit 11 sets line marks at the predetermined intervals on each of the line representing a vein. For each line, at least one line mark is set. The predetermined intervals are each preferably set at such a distance that the linear feature such as a vein can be approximately represented by the group of line marks provided on the line. In this embodiment, the predetermined intervals are each set at a distance corresponding to five to ten percent of the horizontal length of the subject region.

The feature extracting unit 11 calculates, for each line mark, an inclination $\theta$ and a curvature C of the line as the attributes of the feature at the line mark. Then, the feature extracting unit 11 includes, for each extracted line, the coordinates of each pixel on the line, the coordinates, the inclination $\theta$, and the curvature C of each set line mark, in matching feature information.

The inclination $\theta$ of a target line mark may correspond, for example, to the angle between the tangent to the line for which the line mark is set and a horizontal line on the vein image at the position of the line mark. In addition, the curvature C may correspond, for example, to the curvature of a circular arc approximating a predetermined section of the line with a target line mark positioned at the center, for example, the section between two line marks that are each adjacent to the target line mark.

Figure 7:
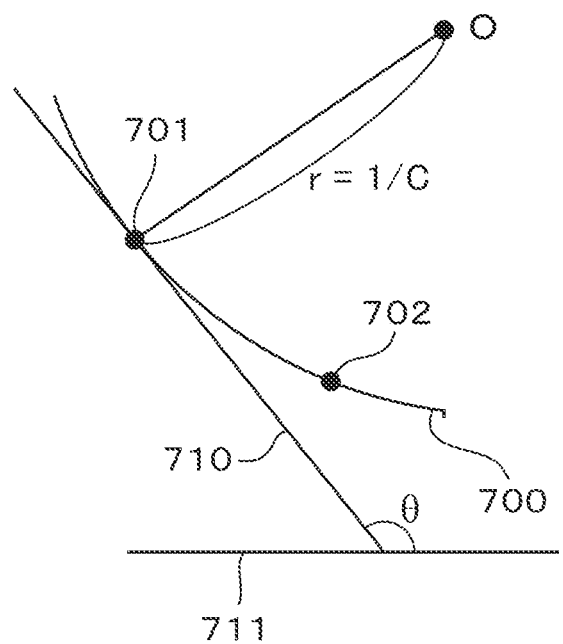
FIG. 7 is a diagram illustrating one example of line marks.

FIG. 7 is a diagram illustrating an example of line marks. In the example illustrated in FIG. 7, two line marks 701 and 702 are set on a linear feature 700. Then, for example, the inclination $\theta$ of the line mark 701 is calculated as the angle between a tangent 710 to the linear feature 700 and a horizontal line 711 on the vein image at the line mark 701. The curvature C at the line mark 701 is the inverse of a radius r of a circular arc 712 approximating a section including the line mark 701, i.e., the distance from center O of the circular arc 712 to the line mark 701.

The rotation correction amount calculating unit 18 calculates a rotation correction amount for correcting the rotation of a user's palm vein pattern with respect to a registered user's palm vein pattern. In this embodiment, the rotation correction amount calculating unit 18 creates a histogram h1 representing the frequency distribution of inclinations $\theta$ on the basis of the obtained user's matching feature information. Similarly, the rotation correction amount calculating unit 18 creates a histogram h2 representing the frequency distribution of the inclinations $\theta$ on the basis of the registered user's matching feature information. Then, the rotation correction amount calculating unit 18 obtains the total of the differences in frequency between the histograms h1 and h2 for each inclination $\theta$, while shifting the histogram h1 in terms of inclination $\theta$. The rotation correction amount calculating unit 18 sets an amount $\Delta\phi$ by which the histogram h1 is shifted when the total of the differences in frequency is the smallest, as a rotation correction amount.

The scale correction amount calculating unit 19 calculates a scale correction amount for correcting the difference in size of the user's palm vein pattern with respect to the registered user's palm vein pattern. In this embodiment, the scale correction amount calculating unit 19 creates a histogram h1 representing the frequency distribution of distances d between two adjacent lines, on the basis of the obtained user's matching feature information. Similarly, the scale correction amount calculating unit 19 creates a histogram h2 representing the frequency distribution of the distances d between two adjacent lines, on the basis of the registered user's matching feature information. Then, the scale correction amount calculating unit 19 obtains the total of the differences in frequency between the histograms h1 and h2 for each distance d, while shifting the histogram h1 in terms of distance d. The scale correction amount calculating unit 19 sets an amount $\Delta d$ by which the histogram h1 is shifted when the total of the differences in frequency is the smallest, as a scale correction amount.

The rotation correction amount calculating unit 18 may calculate a rotation correction amount by any one of various methods for calculating a rotation correction amount for the target objects represented on two respective images. In addition, the scale correction amount calculating unit 19 may calculate a scale correction amount by any one of various methods for calculating the scale correction amount for the target objects represented on two respective images.

The rotation and scale correcting unit 20 rotates the coordinates of the pixels on each line and the coordinates and inclination $\theta$ of each line mark included in the matching feature information, about the center of the vein image by the obtained rotation correction amount $\Delta\phi$. Thereby, the rotation and scale correcting unit 20 corrects the rotation of the user's palm vein pattern with respect to the registered user's vein pattern, on the vein image.

Then, the rotation and scale correcting unit 20 corrects the position of each pixel on each line included in the matching feature information by using the center of the vein image as the origin so that the position would have the distance obtained by multiplying the distance from the origin to the pixel by the obtained scale correction amount $\Delta d$. Similarly, the rotation and scale correcting unit 20 corrects the position of each line mark included in the matching feature information so that the position would have the distance obtained by multiplying the distance from the origin to the line mark by the obtained scale correction amount $\Delta d$. The rotation and scale correcting unit 20 also corrects the curvature C at each line mark by dividing the curvature C by the scale correction amount $\Delta d$.

The voting unit 12 generates a plurality of pairs of a line mark selected from the plurality of line marks included in the user's matching feature information thus corrected in terms of rotation and scale and a line mark selected from the plurality of line marks included in the registered user's matching feature information. Then, the voting unit 12 obtains, for each of the plurality of pairs, a translation amount for aligning the line marks included in the user's matching feature information and the line marks included in the registered user's matching feature information. Then, the voting unit 12 votes a voting value determined according to the following equation, for the coordinates corresponding to the obtained translation amounts in the voting coordinate system.

$$\text{Weight} = e^{-\alpha\Delta\theta} e^{-\beta\Delta C} \qquad (4)$$

In Equation (4), Weight denotes a voting value. Δθ denotes the absolute value of the difference in inclination θ between two target line marks. ΔC denotes the absolute value of the difference in curvature C between two target line marks. Each of α and β is a constant. In this embodiment, since the rotation of the user's palm vein pattern with respect to the registered user's vein pattern on the vein images is already corrected, it is assumed that the rotation angle of the user's palm vein pattern with respect to the registered user's palm vein pattern falls within a tolerance range. Hence, α is set, for example, at 1, as α in Equation (1). Moreover, in this embodiment, since the difference in size between the user's palm vein pattern and the registered user's palm vein pattern on the vein images is already corrected, it is assumed that the difference in curvature between the registered user's palm vein and the user's palm vein falls within the tolerance range. Hence, the constant β is set so that the voting value would be 0.01 when the difference is the maximum tolerance value, for example.

As apparent from Equation (4), the voting value is larger as the absolute value Δθ of the difference in inclination and the absolute value ΔC of the difference in curvature between two target line marks are smaller. A voting value may be determined on the basis of one of the absolute value of the difference in inclination and the absolute value in curvature by assuming that one of α and β is 0.

In addition, as in the first embodiment, the translation amount calculating unit 13 may be configured to vote for, when the translation amount (x0,y0) is obtained for a target pair of line marks, not only the coordinates (x0,y0) but also the coordinates around the coordinates (x0,y0) according to Equation (2) or the following equation in this embodiment.

$$\text{Weight} = \frac{1}{\sqrt{2\pi\sigma^2}} e^{-\left(\frac{(x-x_0)^2 + (y-y_0)^2}{2\sigma^2}\right)} e^{-\alpha\Delta\theta} e^{-\beta\Delta C} \quad (5)$$

The translation amount calculating unit 13 sets the horizontal and vertical translation amounts corresponding to the coordinates having the largest total of the voting values in the voting coordinate system, as a translation amount for aligning the user's palm vein pattern and the registered user's palm vein pattern on the vein image.

According to the second embodiment, the biometric authentication apparatus can directly obtain a translation amount for alignment without approximating linear features using a plurality of line segments, consequently reducing errors in alignment due to approximation. Hence, this biometric authentication apparatus can obtain a translation amount for alignment more accurately.

As in the second embodiment, the processing unit 7 in the first embodiment may also include the rotation correction amount calculating unit 18, the scale correction amount calculating unit 19, and the rotation and scale correcting unit 20, and may correct the difference in rotation and size between two vein patterns.

According to another modified example of each of the above-described embodiments, the alignment unit 14 may correct the position of the vein pattern on the user's vein image by moving each pixel in the vein image by the translation amount calculated by the translation amount calculating unit 13. In this case, not only the features extracted from the vein image but also the vein pattern itself are aligned with the registered user's vein pattern. Hence, when the registered user's vein image is stored in the storage device 5, the matching unit 15 can calculate the matching score by performing pattern matching only once on the user's vein image thus corrected in terms of position and the registered user's vein image.

It is sometimes difficult to obtain an accurate translation amount for alignment due to, for example, noise added to the image and the like. In view of this, according to another modified example of each of the above-described embodiments, the translation amount calculating unit 13 may select a plurality of coordinates in descending order of total of the voting values, and obtain a translation amount corresponding to each pair of selected coordinates. Then, the alignment unit 14 may correct the position of each feature included in the matching feature information, on the basis of the corresponding one of the plurality of translation amounts. Then, the matching unit 15 may calculate, for each of the plurality of translation amounts, a matching score on the basis of the feature thus corrected in terms of position, and notify the authentication judging unit 16 of the largest matching score value. This increases the possibility of using a matching score obtained when the user's palm vein pattern and the registered user's palm vein pattern on the vein images are aligned relatively accurately, even when it is difficult to obtain an accurate translation amount for alignment.

It is highly likely that the total of the voting values is also large at the coordinates around the coordinates having the largest total value of the voting values, due to errors in feature extraction and the like. To prevent a plurality of similar translation amounts from being selected, the translation amount calculating unit 13 may exclude the coordinates within a range of (X1±Δ,Y1±Δ) having the selected coordinates (X1,Y1) as the center, from the selection candidates. In the above, Δ may denote the average distance between adjacent features of the target object for alignment on the image, for example, the average distance between adjacent veins on the vein image in the above example.

The alignment apparatus according to any of the above-described embodiments and the modified examples of the embodiments may be applied to an apparatus for detecting a specific pattern represented on an image, such as a character recognition apparatus, other than a biometric authentication apparatus, for example. Features representing the target object for alignment are not limited to linear features, and may be, for example, points or regions in any shape on the image. In this case, as in the case of linear features, the voting unit 12 calculates a translation amount for aligning the features on one image with the features on the other image, and votes for the coordinates corresponding to the translation amount in the voting coordinate system. When each feature is a region, the center of the region is used as the position of the feature, for example. The voting unit 12 may determine the voting value so that the voting value would be larger as the absolute value of the difference in area between two target features is smaller. In this case, the voting unit 12 may obtain a voting value by substituting an absolute value ΔS of the difference in area between the two target features for Δθ in Equation (2), for example.

A target object for alignment may be an object represented by the combination of a plurality of lines such as a fingerprint or a character. In this case, the feature extracting unit 11 may detect, as features, ridge endings and ridge bifurcations of a fingerprint on an image representing the fingerprint, by performing template matching on the image with a template representing ridge endings and ridge bifurcations of a fingerprint. In this case, the kinds of features such as bifurcations and endings are used as the attributes of the features. Then, the voting unit 12 may determine a voting value so that the voting value when the kinds of two target features are the same would be larger than that when the kinds of two target features are different.

When the difference in position only occurs in either horizontally or vertically between the target object on one image and the target object on the other image, the voting coordinate system may be a one-dimensional coordinate system indicating the corresponding one of a horizontal translation amount and a vertical translation amount. Then, the voting unit 12 votes for the coordinate corresponding to the corresponding one of the horizontal translation amount and the vertical translation amount for aligning two target features in the one-dimensional voting coordinate system.

Figure 8:
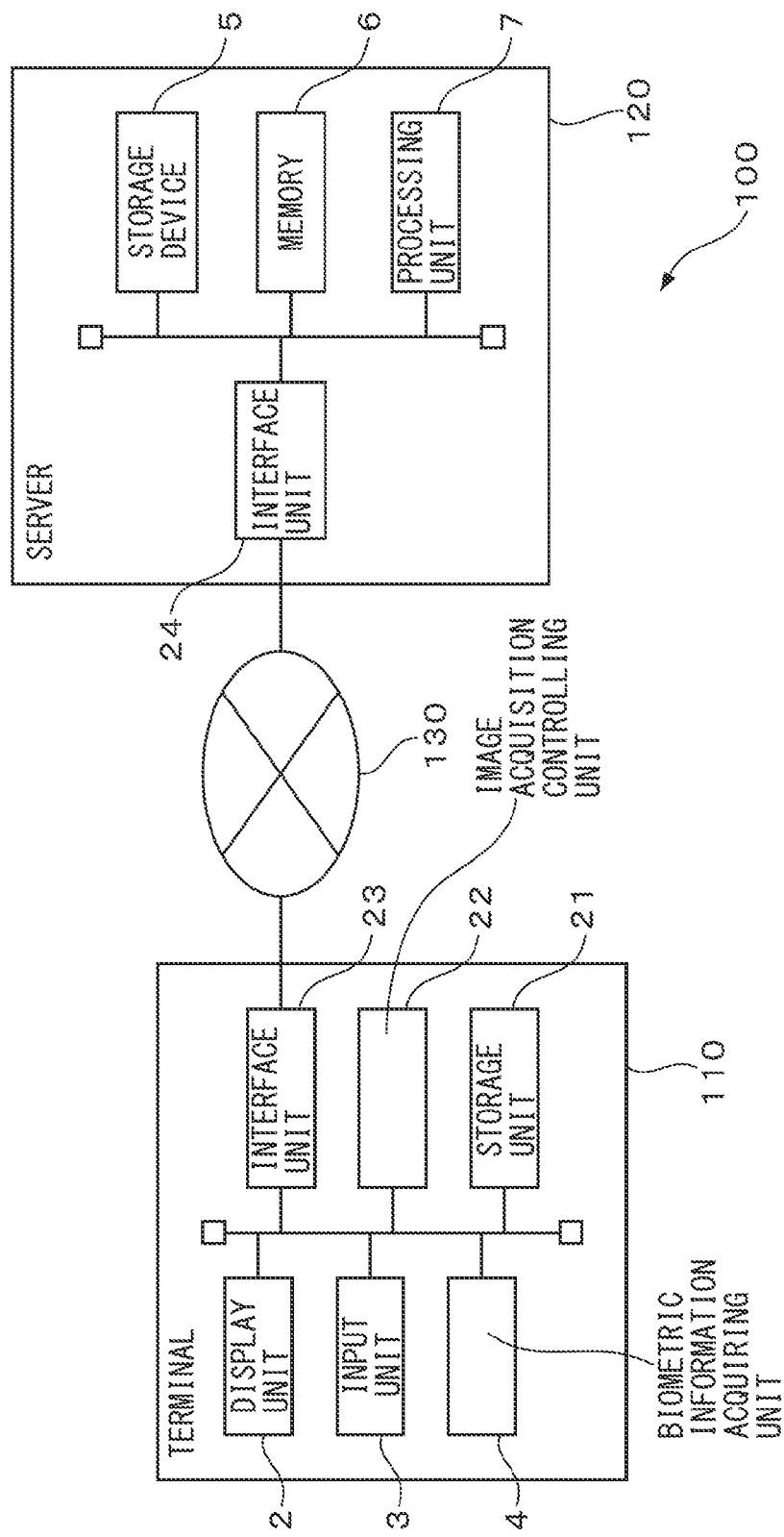
FIG. 8 is a diagram schematically illustrating the configuration of an example of a computer system in which the biometric authentication apparatus according to one of the embodiments and the modified examples of the embodiments is incorporated.

FIG. 8 is a schematic diagram illustrating a configuration of an example of a computer system for carrying out the biometric authentication process or the registration process including the alignment process, according to any one of the above-described embodiments and the modified examples of the embodiments. For example, a computer system 100 includes at least one terminal 110 and a server 120. The terminal 110 and the server 120 are connected via a wired or wireless communication network 130. Note that, in FIG. 8, among components included in the computer system 100, a component corresponding to any of components included in the biometric authentication apparatus 1 illustrated in FIG. 1 is denoted by the same reference number as the component included in the biometric authentication apparatus 1.

In this system, the terminal 110 is, for example, a stationary terminal, and includes a display unit 2, an input unit 3, and a biometric information acquiring unit 4. The terminal 110 also includes a storage unit 21, an image acquisition controlling unit 22, and an interface unit 23.

The storage unit 21 includes, for example, a semiconductor memory circuit, and temporarily stores a vein image generated by the biometric information acquiring unit 4. The image acquisition controlling unit 22 includes one or more processors and peripheral circuits thereof, controls each unit of the terminal 110, and executes various kinds of programs that operate on the terminal 110. Then, the image acquisition controlling unit 22 transmits the vein image generated by the biometric information acquiring unit 4, to the server 120 via the interface unit 23 including an interface circuit for connecting the terminal 110 to the communication network 130. The image acquisition controlling unit 22 may also transmit user identification information entered via the input unit 3, to the server 120.

The server 120 includes a storage device 5, a memory 6, a processing unit 7, and an interface unit 24 including an interface circuit for connecting the server 120 to the communication network 130. The processing unit 7 of the server 120 carries out the biometric authentication process or the registration process by implementing the function of each unit incorporated in the processing unit according to any one of the above-described embodiments and the modified examples of the embodiments, by using the vein image received via the interface unit 24. Then, when the processing unit 7 carries out the biometric authentication process, the server 120 returns a result of determination indicating whether the authentication succeeded or not, to the terminal 110 via the interface unit 24.

Alternatively, the image acquisition controlling unit 22 of the terminal 110 may carry out the process of the feature extracting unit 11 among the functions of the processing unit according to any one of the above-described embodiments. In this case, matching feature information extracted from a vein image of a user and identification information of the user may be transmitted from the terminal 110 to the server 120. Meanwhile, the processing unit 7 of the server 120 carries out all the processes other than that of the feature extracting unit 11 among the functions of the processing unit according to any one of the above-described embodiments. In this way, load on the server 120 is reduced, and hence the computer system 100 can prevent the user to waiting time from increasing, even when a number of biometric authentication processes are performed at the same time.

A computer program including instructions for causing a computer to implement the functions of the processing unit according to the above-described embodiment may be provided in the form recorded on a recording medium such as a magnetic recording medium, an optical recording medium, and a nonvolatile semiconductor memory. However, the computer-readable recording medium here does not include a carrier wave.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An alignment apparatus comprising:
   a processor configured to:
   generate a plurality of pairs of a first feature, which is selected from a plurality of features representing a first target object represented on one image, and a second feature, which is selected from a plurality of features representing a second target object represented on another image;
   obtain, for each of the plurality of pairs, a first translation amount for aligning the first feature with the second feature;
   vote, in a coordinate system with coordinates each representing a translation amount, a voting value for the coordinate corresponding to the first translation amount for each of the plurality of pairs, the voting value set at a larger value as difference in predetermined attribute between the first feature and the second feature is smaller;
   calculate a total of the voting values for each of the coordinates in the coordinate system; and
   set the translation amount corresponding to the coordinate with largest total of the voting values, as a second translation amount for aligning the first target object with the second target object.

2. The alignment apparatus according to claim 1, wherein the processor further configured to translate at least the plurality of first features or the plurality of second features in accordance with the second translation amount.

3. The alignment apparatus according to claim 1, wherein each of the first features and the second features is a line, and one or more reference points for alignment are set on each of the lines that are the first features and the lines that are the second features, and
   the obtaining the first translation amount obtains, as the first translation amount, a translation amount for aligning any one of the reference points set on the first feature with each of the reference points set on the second feature.

4. The alignment apparatus according to claim 3, wherein
each of the first target object and the second target object
is a palm vein pattern, and
the lines that are the first features correspond to veins
included in the palm vein pattern on the one image,
while the lines that are the second features correspond
to veins included in the palm vein pattern on the other
image.

5. The alignment apparatus according to claim 1, wherein
the voting the voting value votes the voting value for the
coordinate within a predetermined range with the coordinate
corresponding to each of the first translation amounts as
center in the coordinate system.

6. The alignment apparatus according to claim 5, wherein
the voting the voting value sets the voting value at a smaller
value as the coordinate is further from the coordinate
corresponding to each of the first translation amounts in the
coordinate system.

7. The alignment apparatus according to claim 6, wherein
the voting the voting value does not vote for the coordinate
with the voting value equal to or smaller than a predetermined value among the coordinates in the predetermined
range.

8. The alignment apparatus according to claim 1, wherein
the calculating the total of the voting values calculates, for
each of the coordinates in the coordinate system, total of the
voting values in a predetermined range with the coordinate
as center.

9. An alignment method comprising:
generating, by a processor, a plurality of pairs of a first
feature, which is selected from a plurality of features
representing a first target object represented on one
image, and a second feature, which is selected from a
plurality of features representing a second target object
represented on another image;
obtaining, by the processor, for each of the plurality of
pairs, a first translation amount for aligning the first
feature with the second feature;
voting, by the processor, in a coordinate system with
coordinates each representing a translation amount, a
voting value for the coordinate corresponding to the
first translation amount for each of the plurality of
pairs, the voting value set at a larger value as difference
in predetermined attribute between the first feature and
the second feature is smaller;
calculating, by the processor, the total of the voting values
for each of the coordinates in the coordinate system;
and
setting, by the processor, the translation amount corresponding to the coordinate with largest total of the
voting values, as a second translation amount for aligning the first target object with the second target object.

10. The alignment method according to claim 9, further
comprising:
translating, by the processor, at least the plurality of first
features or the plurality of second features in accordance with the second translation amount.

11. The alignment method according to claim 9, wherein
each of the first features and the second features is a line,
and one or more reference points for alignment are set
on each of the lines that are the first features and the
lines that are the second features, and
the obtaining the first translation amount obtains, as the
first translation amount, a translation amount for aligning any one of the reference points set on the first
feature with each of the reference points set on the
second feature.

12. The alignment method according to claim 11, wherein
each of the first target object and the second target object
is a palm vein pattern, and
the lines that are the first features correspond to veins
included in the palm vein pattern on the one image,
while the lines that are the second features correspond
to veins included in the palm vein pattern on the other
image.

13. The alignment method according to claim 9, wherein
the voting the voting value votes the voting value for the
coordinate within a predetermined range with the coordinate
corresponding to each of the first translation amounts as
center in the coordinate system.

14. The alignment method according to claim 13, wherein
the voting the voting value sets the voting value at a smaller
value as the coordinate is further from the coordinate
corresponding to each of the first translation amounts in the
coordinate system.

15. The alignment method according to claim 14, wherein
the voting the voting value does not vote for the coordinate
with the voting value equal to or smaller than a predetermined value among the coordinates in the predetermined
range.

16. The alignment method according to claim 9, wherein
the calculating the total of the voting values calculates, for
each of the coordinates in the coordinate system, total of the
voting values in a predetermined range with the coordinate
as center.

17. A non-transitory computer-readable recording
medium having recorded thereon an alignment computer
program that causes a computer to execute a process comprising:
generating a plurality of pairs of a first feature, which is
selected from a plurality of features representing a first
target object represented on one image, and a second
feature, which is selected from a plurality of features
representing a second target object represented on
another image;
obtaining, for each of the plurality of pairs, a first translation amount for aligning the first feature with the
second feature;
voting, in a coordinate system with coordinates each
representing a translation amount, a voting value for
the coordinate corresponding to the first translation
amount for each of the plurality of pairs, the voting
value set at a larger value as difference in predetermined attribute between the first feature and the second
feature is smaller;
calculating the total of the voting values for each of the
coordinates in the coordinate system; and
setting the translation amount corresponding to the coordinate with largest total of the voting values, as a
second translation amount for aligning the first target
object with the second target object.

* * * * *